Figure 1:
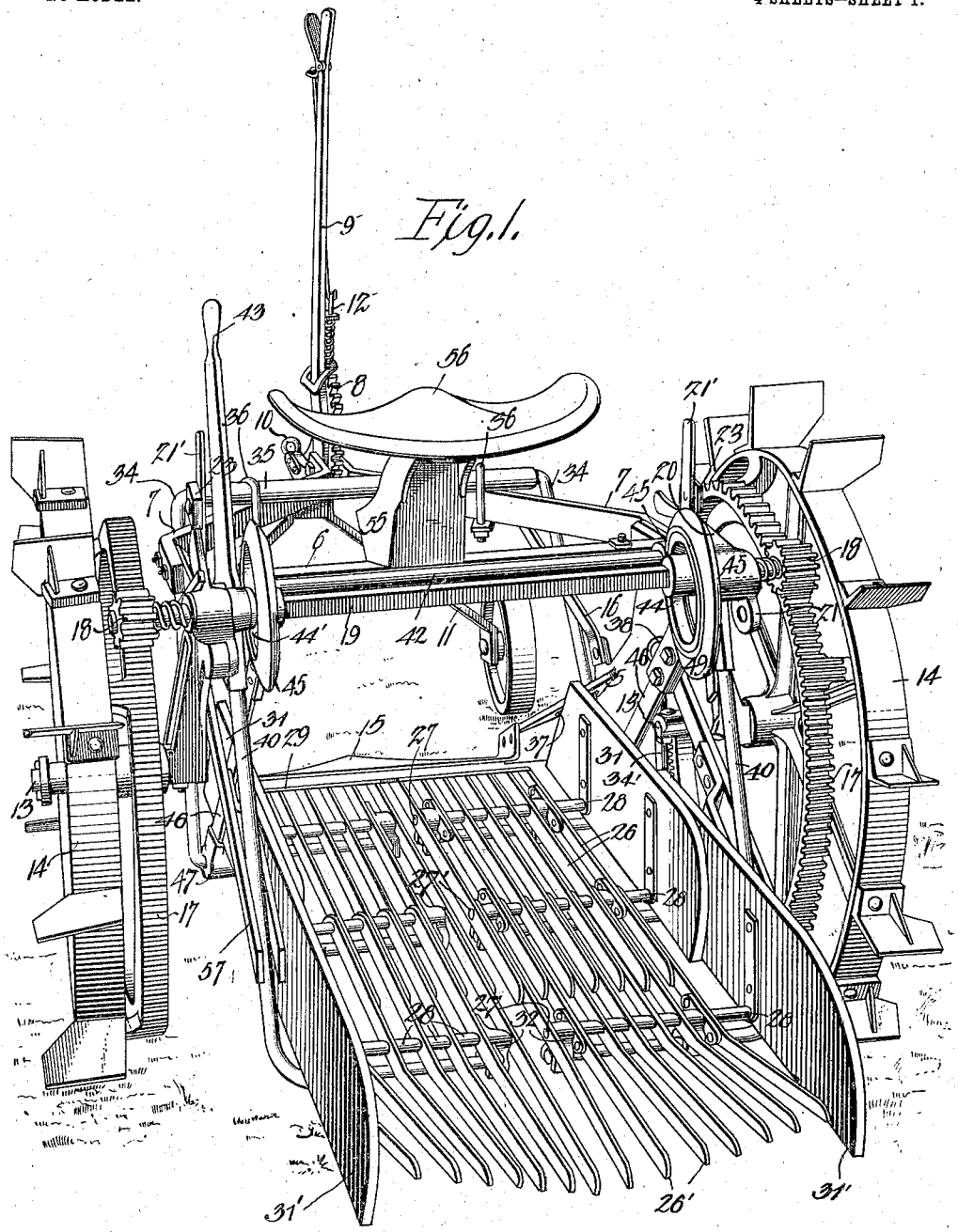

No. 739,299. PATENTED SEPT. 22, 1903.
J. E. EGAN.
POTATO DIGGER.
APPLICATION FILED NOV. 13, 1902.
NO MODEL. 4 SHEETS—SHEET 1.

Witnesses
J. E. Egan, Inventor.
by
Attorneys

No. 739,299. PATENTED SEPT. 22, 1903.
J. E. EGAN.
POTATO DIGGER.
APPLICATION FILED NOV. 13, 1902.
NO MODEL. 4 SHEETS—SHEET 2.
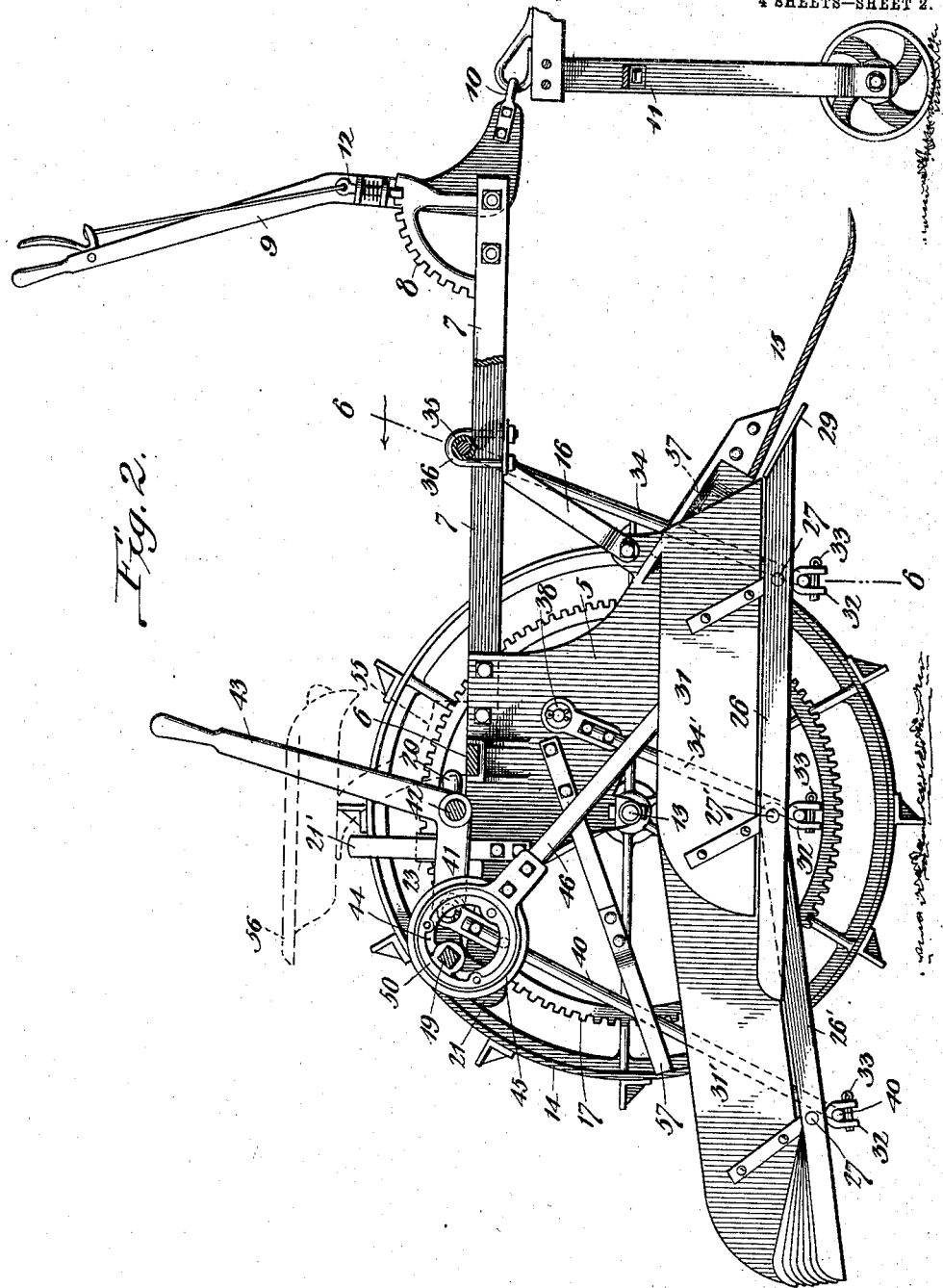
Witnesses
J. E. Egan, Inventor.
by C. A. Snow & Co.
Attorneys

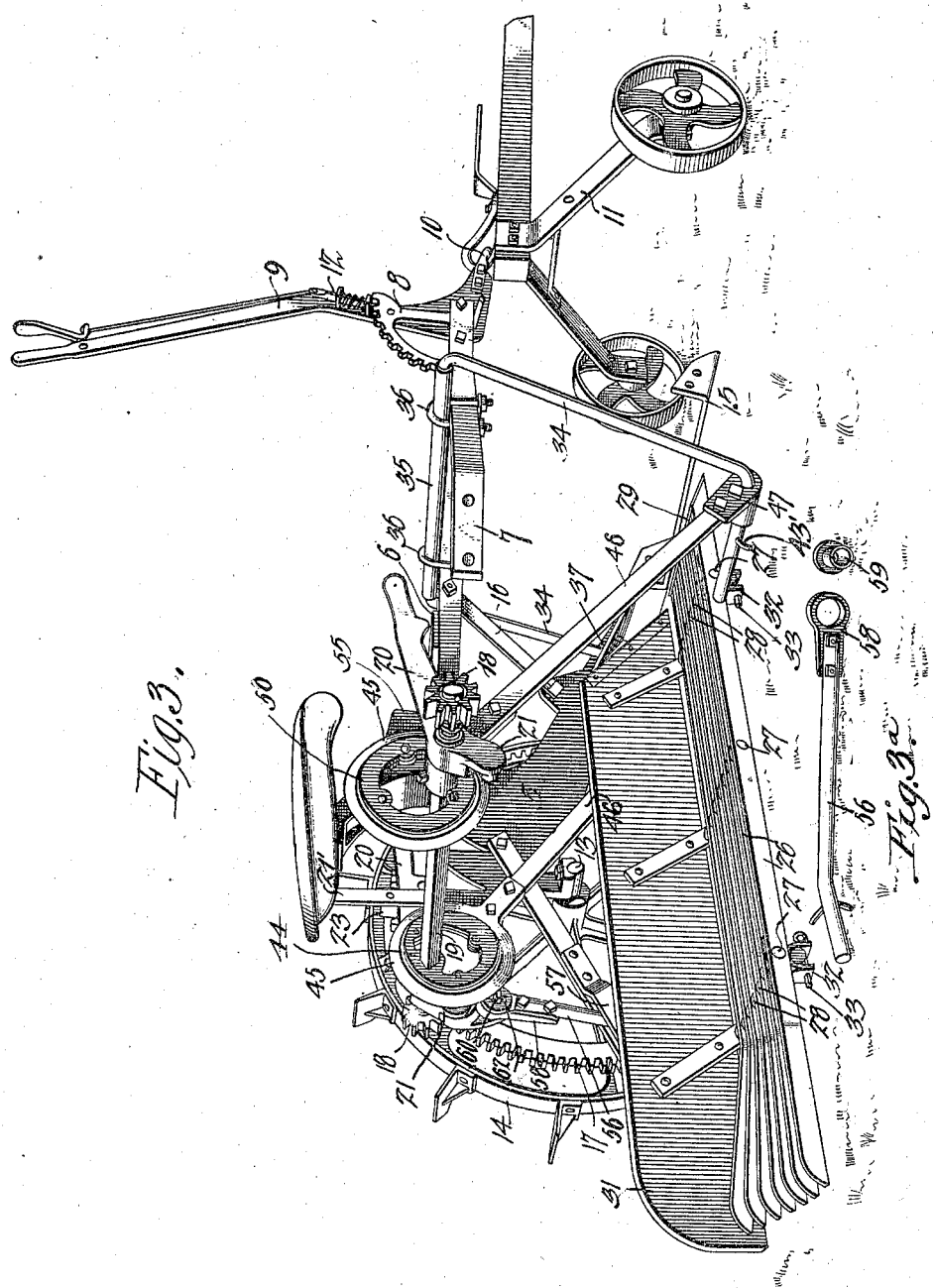

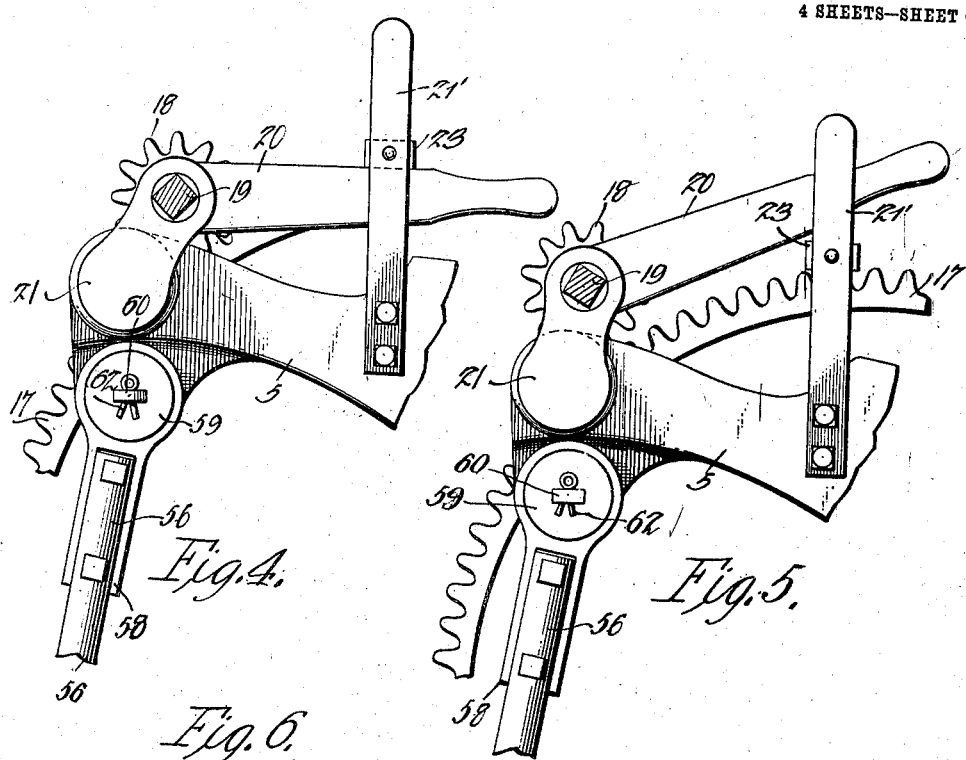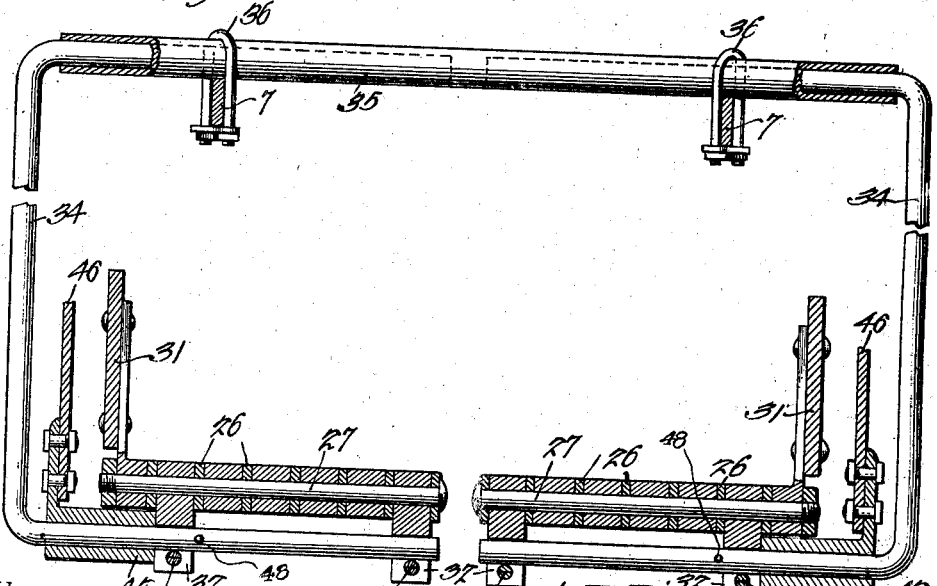

No. 739,299. Patented September 22, 1903.

UNITED STATES PATENT OFFICE.

JOSEPH EDWARD EGAN, OF LA CROSSE, WISCONSIN.

POTATO-DIGGER.

SPECIFICATION forming part of Letters Patent No. 739,299, dated September 22, 1903.

Application filed November 13, 1902. Serial No. 131,255. (No model.)

*To all whom it may concern:*

Be it known that I, JOSEPH EDWARD EGAN, a citizen of the United States, residing at La Crosse, in the county of La Crosse and State of Wisconsin, have invented a new and useful Potato-Digger, of which the following is a specification.

The invention relates to certain improvements in potato-diggers of that class in which the potatoes are raised from the ground by a shovel or scoop and deposited on a shaking-separator, by which the earth is loosened and falls on the surface, while the potatoes are gradually traveled to the rear of the machine and deposited on top of the loosened earth.

The principal object of the invention is to construct an efficient machine capable of ready adjustment for different classes of work or in accordance with the nature and condition of the soil and in which the parts may be readily assembled or removed from position when it becomes necessary to make repairs.

A further object of the invention is to provide a simple form of adjusting means for regulating the movement of the shaking-separator, and a still further object is to provide for the disconnection of the shaker-operating mechanism when necessary, as in traveling to and from the field of operation.

A still further object of the invention is to provide an improved form of shaker which may be adjusted to govern the time required for the passage of the dirt and potatoes in accordance with the character of the soil and the grade of the field on which the machine is operating.

With these and other objects in view the invention consists in the novel construction and arrangement of parts hereinafter described, illustrated in the accompanying drawings, and particularly pointed out in the appended claims, it being understood that various changes in the form, proportions, size, and minor details may be made without departing from the spirit or sacrificing any of the advantages of the invention.

In the accompanying drawings, Figure 1 is a perspective view of the potato-digger constructed in accordance with my invention. Fig. 2 is a longitudinal sectional elevation of the same. Fig. 3 is a perspective view of a slightly-modified construction of the device, one of the side frames and supporting-wheels being removed in order to more clearly illustrate the construction. Fig. 3ª is a detail perspective view of a portion of the mechanism detached. Figs. 4 and 5 are detail views of the mechanism for throwing the shaker-operating devices into and out of operation. Fig. 6 is a transverse sectional elevation of a portion of the machine on the line 6 6 of Fig 2, illustrating the arrangement of the pivot bars for the support of the shaker.

Similar numerals of reference are employed to indicate corresponding parts throughout the several figures of the drawings.

The frame of the machine comprises side castings 5, connected to each other by an upper cross-bar 6, and from each casting extends a side bar 7, said bars converging at the front of the machine and serving as supports for a toothed locking-segment 8. Pivoted at the front end of the side bars is a lever 9, connected by a link or yoke 10 to the rear end of a wheeled truck 11, the lever being adjustable to regulate the vertical height of the side bars 7 and the depth at which the shovel or scoop enters the ground. The lever and frame when adjusted to position are locked by means of a bolt 12, carried by the lever and adapted to engage in the locking-notches of the segment 8. The castings 5, which form the main side members of the frame, are provided with short axle-sections 13 for the reception of supporting-wheels 14, which may be of any ordinary construction, and at the front end of the side frame is secured a shovel or scoop 15, adapted to enter the ground and raise the potatoes above the surface. The frame is further strengthened by side braces 16, which connect the castings to intermediate portions of the side bars 7, as clearly shown in Fig. 2.

To each of the wheels 14 is secured a large gear-wheel 17, adapted to intermesh with a pinion 18, clutched to a shaft 19, in one direction of movement and free to rotate on said shaft in the opposite direction or in the event of the machine being backed. The shaft 19 is adapted to suitable bearings formed in levers 20, each having a short arm 21 extending downwardly and rearwardly of the shaft and pivotally connected to a rearwardly-extending portion of the frame of the machine. The handled ends of the lever 20 are disposed adjacent to vertical springs 21', secured at their lower ends to the side frames and provided with projecting blocks 23, which serve to engage above the levers when the latter are depressed and firmly lock the pinions 18 in engagement with the gear-wheels. When traveling to and from the field of operation and at such other times as may be necessary, the operator moves the springs to lever-releasing position and can then raise the levers until the pinions are free from engagement with the gear-wheel, thus throwing the shaker-agitating mechanism out of operation. The shaking-separator is made up of a number of sections and receives swinging motion of the agitator type to separate the potatoes from the earth. In the construction illustrated in Figs. 1 and 2 the separator is formed of two main sections extending parallel with each other longitudinally of the machine, and each of these sections is divided into a front and a rear section, each composed of a number of parallel bars spaced from each other to permit the soil to fall to the surface of the ground.

The forward bars 26 and the rear bars 26' of each section of the shaker are connected by bolts 27 and intervening spacing-blocks 28, as more clearly shown in Fig. 6, and the two members of each main section are connected by a pivot-bolt 27' to permit the ready adjustment of the angular position of the rear member. The front ends of the rear members of the shaker terminate at the pivot-bolt 27', while the rear ends of the front members are extended some distance beyond the pivot-bolts, as shown more clearly in Fig. 2. The front ends of the front shaker-bars of each section are tapered and are covered by a steel cap-piece 29, located under the shovel 15, and serve to elevate any potatoes which may be left by the shovel and at the same time prevent injury to the potatoes from direct contact with the tapering ends of the bars. The front members of each front section of the shaker are provided with side boards 31, and the rear members have side boards 31', fulcrumed on the pivot-bolt 27', the sections of the side boards overlapping in order to prevent potatoes and earth from rolling off at the sides of the separator without being separated. Near the opposite ends of each of the bolts 27 and 27' are downwardly-projecting U-shaped clips 32, adapted for the reception of the shaker-supporting bars, the shaker-sections being retained in proper position by suitable pins or keys 33, extending through openings formed in the clips, as shown in Fig. 2. The front end of each front shaker-section is supported by a U-shaped bar 34, having its upper horizontally-disposed end fitted within a transversely-disposed tube 35, resting on the side bars 7 and secured in position by clips 36, the tube being adjustable to the front or rear in order to regulate the extent of movement of the separator-sections in accordance with the character of the work. The horizontal arms of the supporting-bars 34 each extend about half-way through the tube 35, and each is free for movement independent of the other, while extensive lateral play is prevented by passing the vertical portions of said bars through suitable guiding-openings 37 in the side castings, although the bars may extend either inside or outside the frames and be held from lateral movement by any desired mechanism. The central portions of each of the main shaker-sections at the juncture of the front and rear ends thereof are supported by hangers 34' in the form of angular bars, the horizontal members adapted to the clips 32 and upright members pivoted on studs 38, projecting from the inner faces of the main castings 5.

The depending clips 32 at the rear ends of the shaker-section are adapted for the reception of the horizontal member of a hanger 40, one of such hangers being arranged at each side of the machine and pivotally connected at its upper end to a crank-arm 41, secured to a rock-shaft 42, extending transversely of the machine and adapted to suitable bearings on the main frame. The rock-shaft is provided with a lever 43, which may be operated to adjust the angular position of the rear members of the shaker-sections and increase or decrease the resistance offered to the passage of the potatoes and dirt in accordance with the character of the soil. This arrangement further permits of adjustment of the shaker to compensate for the grade of the field should the potatoes be planted on sloping ground.

To the shaft 19 is secured a pair of eccentrics 44, on which are eccentric-straps 45, connected by rods 46 to the front hangers 34, a small casting 47 being bolted to the lower end of the connecting-rod and encircling the lower horizontal portion of the hanger. The inner edge of the casting 47 fits against the outward side of one of the clips 32 of the separator, and the latter is held from inward movement by a pin 48, extending through an opening in the hanger and bearing against the face of one of the clips 32. The eccentrics 44 are arranged diametrically opposite to each other, or in such position that when one is raising the forward end of the shaker-section to which it is attached the other is depressing the opposite shaker-section, the motion being constant and facilitating the separation of the potatoes from heavy or clay soil. The construction of the eccentrics and straps is simplified by making each of the straps in the form of a complete ring, which is slipped over the eccentric and held in position by a ring-like casting 50, bolted or otherwise secured in position.

To the central portion of the upper cross-bar 6 is secured a hollow standard 55, serving as a tool-box and acting also as a support for a driver's seat 56.

In operation the lever 9 is adjusted to depress the pointed shovel 15 until the latter enters the ground at the desired depth, and then the levers 20 are moved to a substantially horizontal position until they are engaged and held by the catch-blocks 23 on the springs 21'. As the machine is traveled the potatoes are raised by the shovel and delivered, together with the adjacent soil, to the shaking-separator, and as the latter is agitated by the rotation of the eccentrics the potatoes are moved up and down, and the dirt is removed and falls between the bars, while the potatoes are traveled to the rear end of the separator and deposited on the surface of the ground. The extent of movement imparted to the shakers by the eccentrics may be governed by adjusting the tube 35 either to the front or rear in order to lower or raise the front end of the shaker-section, while the lever 9 affords a ready means for governing the depression of the shovel. The number of shaker-sections may be increased or diminished, and in some cases it will not be necessary to provide the sections with independently-adjustable rear members. A construction of this character is illustrated in Fig. 3, wherein the shaker-bars are continuous from the front to the rear of the machine, and the rear hangers are pivotally connected to the rear end of the main frame, as shown in Figs. 3, 4, and 5.

The rear hangers comprise L-shaped bars 56, of which the horizontal portions are adapted to the clips 32, while the vertical portions pass between a pair of guiding-bars 57, which may be also used in connection with the structure illustrated in Figs. 1 and 2, said guiding-bars being secured to and extending rearwardly from the side frames. The upper end of each bar 56 is secured to a small casting 58, having an eye fitting over a thimble or bushing 59, adapted to a stud or pin 60, projecting from the stationary frame, the key or pin 62 being employed to properly maintain the upper end of the bar or hanger in position. The details of construction of this portion of the machine are more clearly illustrated in Fig. 3ª, wherein one of the rear hangers and its thimble are shown detached from the machine.

Having thus described my invention, what I claim is—

1. In a device of the class specified, a frame, a shaking-separator extending lengthwise of the frame and formed of front and rear sections, and means for adjusting the angular positions of said sections with relation to each other.

2. In a device of the class specified, a supporting-frame, a relatively stationary shovel, a shovel-supporting frame, a shaking-separator formed of a plurality of independently-movable sections pivotally mounted at their rear ends and free for swinging movement, and operating mechanism connected to the front ends of said sections for imparting a quick upward and rearward movement to the sections to thereby throw the material carried by the shakers toward the rear.

3. In a device of the class specified, a supporting-frame, a shaking-separator formed of a plurality of independently-movable sections, hangers connecting the frame to front and rear portions of the section, the upper ends of the front hangers being adjustable on the frame to vary the vertical height of the separator-sections.

4. In a device of the class specified, a frame, a shovel carried thereby, a shaking-separator formed of a plurality of independently-movable sections and each comprising a series of substantially parallel bars, connected at their front ends by a cap-piece, and means for imparting agitating movement to said sections.

5. In a device of the class specified, a frame, a shaking-separator formed of a plurality of sections having independently-adjustable members, hangers forming pivotal supports for the shaker-sections, and mechanism for imparting agitating movement to said sections.

6. In a device of the class specified, a shaking-separator formed of a plurality of independently-movable sections, an adjustable member forming a part of each section and disposed at the rear end thereof, means for adjusting said members, pivotal supports for the sections, and mechanism for imparting agitating movement to said sections.

7. In a device of the class specified, a frame, a shaking-separator comprising a plurality of main sections each formed of a number of pivotally-connected members, means for varying the angular position of the rear members of said sections, pivotal supports for the sections, and mechanism for imparting agitating movement to said sections.

8. In a device of the class specified, a supporting-frame, a shaking-separator comprising a pair of main sections each formed of a plurality of members, hangers for supporting said members, overlapping side boards secured to the members, hangers connected to the rear ends of the movable members, a rock-shaft, crank-arms carried by said rock-shaft and connected to the hangers, an adjusting-lever secured to said rock-shaft, eccentrics, means for revolving the same, and rods extending from the eccentrics to the forward ends of the shakers to impart agitating movement to said shakers, substantially as specified.

9. In a device of the class specified, a supporting-frame, a shovel carried thereby, a shaking-separator formed of a plurality of substantially parallel bars having their front ends extending under the shovel, an inclined plate forming a cap for the front ends of said bars, and means for agitating said separator.

10. In a device of the class specified, a wheeled supporting-frame comprising main side sections and forwardly-extending side bars, a shovel carried by the frame, a shaking-separator formed of a plurality of sections, front and rear hangers connecting the separator-sections to a stationary part of the frame, a tube adjustably secured to the side bars and adapted to receive the upper ends of the front hangers, a revoluble shaft, eccentrics carried by said shaft, and connecting-rods extending from the eccentrics to the lower portions of said front hangers.

11. In a device of the class specified, a wheeled supporting-frame comprising main side sections and forwardly-extending side bars, a shovel carried by the frame, a shaking-separator formed of a plurality of sections, rear hangers connecting the rear portions of the separator-sections to the frame, front hangers each comprising a substantially U-shaped bar pivotally connected at its lower end to a separator-section, a tube carried by the side bars and adapted to receive the upper ends of said front hangers, means for adjustably securing the tube to the side bars, and eccentrics for agitating said separator-section.

12. In a device of the class specified, a wheeled supporting-frame comprising main side sections and forwardly-extending side bars, a shovel carried by the frame, a shaking-separator formed of a plurality of sections each section comprising a series of spaced bars, depending clips carried by the sections at points adjacent to the front and rear ends thereof, front hangers depending from the frame and having their lower ends engaging said plates, rear hangers engaging the rear clips, and pivot-studs carried by the frame for the support of the upper ends of said rear hangers.

13. In a device of the class specified, a wheeled supporting-frame comprising main side sections and forwardly-extending side bars, a shaking-separator formed of a plurality of independently-movable sections, hangers forming a linked connection between the separator-sections and the frame, and stationary guides for preventing lateral play of said hangers.

14. In a device of the class specified, a wheeled frame comprising main side sections and forwardly-extending side bars, a shovel carried by the frame, a shaker comprising a plurality of sections, hangers forming an independent connection between the sections and the frame, an eccentric-shaft, eccentrics mounted thereon and each connected separately to one of the shaker-sections, and means for revolving said shaft.

In testimony that I claim the foregoing as my own I have hereto affixed my signature in the presence of two witnesses.

JOSEPH EDWARD EGAN.

Witnesses:
F. H. BLOOMINGDALE,
LINDA E. KING.